(12) United States Patent
Goel et al.

(10) Patent No.: US 9,055,531 B2
(45) Date of Patent: Jun. 9, 2015

(54) PORTABLE AP ENHANCEMENTS

(75) Inventors: Sandesh Goel, Pune (IN); Rajesh Shreeram Bhagwat, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 312 days.

(21) Appl. No.: 12/435,871

(22) Filed: May 5, 2009

(65) Prior Publication Data

US 2010/0138549 A1 Jun. 3, 2010

Related U.S. Application Data (60) Provisional application No. 61/118,727, filed on Dec. 1, 2008.

(51) Int. Cl.
| | |
|---|---|
| G06F 15/16 | (2006.01) |
| G06F 15/173 | (2006.01) |
| H04W 52/02 | (2009.01) |
| H04W 88/08 | (2009.01) |

(52) U.S. Cl.
CPC .......... *H04W 52/0225* (2013.01); *H04W 88/08* (2013.01); *H04W 52/0206* (2013.01)

(58) Field of Classification Search
CPC ................... H04L 12/40039; H04W 52/0225; H04W 52/0235; H04W 52/04; H04W 88/08
USPC ........... 709/224, 226, 228, 229, 234; 713/323
See application file for complete search history.

(56) References Cited

U.S. PATENT DOCUMENTS

| | | | |
|---|---|---|---|
| 7,310,524 B2 | 12/2007 | Kurokawa | |
| 7,333,460 B2 | 2/2008 | Vaisanen et al. | |
| 7,436,790 B2 * | 10/2008 | Todd et al. | 370/311 |
| 2002/0168993 A1 * | 11/2002 | Choi et al. | 455/522 |
| 2004/0023609 A1 | 2/2004 | Oshita et al. | |
| 2004/0203609 A1 * | 10/2004 | Sameer et al. | 455/412.1 |
| 2004/0259544 A1 | 12/2004 | Amos | |
| 2005/0047384 A1 * | 3/2005 | Wax et al. | 370/338 |
| 2005/0185613 A1 | 8/2005 | Kowalski et al. | |
| 2005/0249227 A1 * | 11/2005 | Wang et al. | 370/412 |
| 2005/0288904 A1 * | 12/2005 | Warrior et al. | 702/188 |
| 2006/0094370 A1 | 5/2006 | Nguyen | |
| 2006/0099956 A1 | 5/2006 | Harada et al. | |
| 2007/0097933 A1 * | 5/2007 | Kuc | 370/338 |
| 2007/0105526 A1 | 5/2007 | Shoobridge | |
| 2007/0105529 A1 | 5/2007 | Lundstrom et al. | |

(Continued)

FOREIGN PATENT DOCUMENTS

| | | |
|---|---|---|
| CN | 1934881 A | 3/2007 |
| CN | 1934881A A | 3/2007 |

(Continued)

OTHER PUBLICATIONS

International Search Report issued on PCT/US2009/042884, dated Dec. 22, 2009.

(Continued)

*Primary Examiner* — Brian J Gillis
*Assistant Examiner* — Austin J Moreau (57) ABSTRACT

An access point configured to connect a station to a wireless network includes a wireless communication unit configured to send data to the station, and a control unit configured to adjust one or more operational parameters of the access point based on indicative parameters of a basic service set (BSS), which includes the access point and the station.

20 Claims, 8 Drawing Sheets

(56) References Cited

U.S. PATENT DOCUMENTS

| | | |
|---|---|---|
| 2007/0223438 A1 | 9/2007 | Bennett |
| 2008/0056201 A1* | 3/2008 | Bennett .......................... 370/334 |
| 2008/0231449 A1* | 9/2008 | Moshfeghi ................. 340/572.1 |
| 2009/0034443 A1* | 2/2009 | Walker et al. ................. 370/311 |
| 2009/0207824 A1 | 8/2009 | Lee et al. |
| 2010/0002610 A1* | 1/2010 | Bowser et al. ................ 370/311 |
| 2010/0008276 A1 | 1/2010 | Kopikare et al. |
| 2010/0041445 A1 | 2/2010 | Qi et al. |
| 2010/0138549 A1 | 6/2010 | Goel et al. |

FOREIGN PATENT DOCUMENTS

| | | |
|---|---|---|
| CN | 101242648 A | 8/2008 |
| WO | WO-2005/094103 A1 | 10/2005 |

OTHER PUBLICATIONS

Office Action for Chinese Patent Application No. 200980116723.5, dated Oct. 10, 2012.
Written Opinion for International application No. PCT/US2009/042884, dated Dec. 22, 2009.
Third Office Action for Chinese Patent Application No. 200980116723.5, dated Jan. 13, 2014.
Second Office Action for Chinese Patent Application No. 200980116723.5, dated Jun. 20, 2012.
Office Action for related U.S. Appl. No. 12/877,564 dated Oct. 10, 2013.
Office Action for related U.S. Appl. No. 12/877,564 dated Mar. 7, 2013.
Office Action in corresponding U.S. Appl. No. 12/877,564, dated Jul. 21, 2014 (21 pages).
Third Office Action in corresponding Chinese Patent Application No. 200980116723.5, dated Jan. 13, 2014, with English translation (23 pages).
Fourth Office Action in corresponding Chinese Patent Application No. 200980116723.5, dated Jul. 25, 2014, with English translation (22 pages).
International Preliminary Report on Patentability in corresponding International Application No. PCT/US2009/042884, dated Jun. 7, 2011 (6 pages).
Rejection Decision in Chinese Application No. 200980116723.5, dated Jan. 30, 2015, with partial English translation (20 pages).

* cited by examiner

PORTABLE AP ENHANCEMENTS

CROSS-REFERENCE TO RELATED APPLICATION

This application claims priority under 35 U.S.C. §119(e) to U.S. Provisional Application No. 61/118,727, filed on Dec. 1, 2008, which is hereby incorporated by reference for all purposes as if fully set forth herein.

BACKGROUND

1. Field of the Invention

This disclosure is directed to an access point, and more particularly to enhancing an access point to consume less power and/or require less memory.

2. Related Art

A wireless access point connects various wireless communication devices associated thereto to a wireless network, and relays data to and/or from the associated wireless communication devices. For example, the wireless communication devices, such as, for example, computers, printers, data storage, audio/video devices, and/or the like, may be connected to an access point directly or indirectly, and may exchange data with each other. Thus, the wireless access point is a very popular choice for implementing a home wireless network. Currently, many of the wireless access points on the market are stationary access points, which require an external source and, hence, might not be used when no power source is available. Portable access points typically include an internal power source, such as, e.g., a rechargeable battery, to power the device when no external power source is available.

SUMMARY

In one aspect of the disclosure, an access point configured to connect a station to a wireless network includes a wireless communication unit configured to send data to the station, and a control unit configured to adjust one or more operational parameters of the access point based on indicative parameters of a basic service set (BSS).

According to another aspect of the disclosure, a method of operating an access point configured to connect a station to a wireless network includes monitoring one or more indicative parameters of a basic service set (BSS) which includes the access point and the station, and adjusting one or more operational parameters of the access point based on the one or more indicative parameters of the BSS.

In yet another aspect of the disclosure, a wireless network includes one or more basic service sets (BSS) connected to a distribution system. Each BSS includes one or more stations and an access point configured to connect the one or more stations to the wireless network. The access point includes a wired communication unit connected to the distribution system to receive data destined to the one or more stations, a data storage configured to buffer the data destined to the one or more stations, a wireless communication unit configured to send the data to the one or more stations, and a control unit configured to monitor one or more indicative parameters of the BSS and adjust one or more operational parameters of the access point based on the one or more indicative parameters of the BSS. The one or more indicative parameters of the BSS include at least one of an amount of data traffic flowing through the access point, proximity of the one or more stations to the access point, an activity level in the BSS, and a reaction of the one or more stations to a notification regarding the data buffered at the data storage of the access point. The one or more operational parameters of the access point include at least one of a clock frequency of the control unit, which is adjustable based on the amount of data traffic flowing through the access point, a transmit power of the wireless communication unit, which is adjustable based on the proximity of the one or more stations to the access point, an operational mode of the access point, which is switchable between an active mode and a sleep mode based on the activity level in the BSS, and an occupancy of the data storage, which is adjustable based on the reactions of the one or more stations regarding the data buffered at the data storage of the access point.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The disclosure is directed to enhancing performances of an access point (AP), which is typically used to connect one or more stations associated thereto to a wireless network. The access point and associated remote stations may constitute a basic service set (BSS). The AP performance may be enhanced by monitoring one or more indicative parameters of the BSS and adjusting one or more operational AP parameters based on the one or more indicative BSS parameters. The indicative BSS parameters may include, for example, but are not limited to, an amount of data traffic flowing through the access point, proximity of the associated station to the access point, an activity level in the BSS, a reaction of the associated stations regarding data destined thereto and buffered at the access point, and/or the like. The operational AP parameters may include, for example, but are not limited to, a clock frequency of the access point, a transmit power of the access point, an operational mode of the access point, an occupancy of a buffer of the access point configured to buffer data destined to the associated station, and/or the like.

Figure 1:
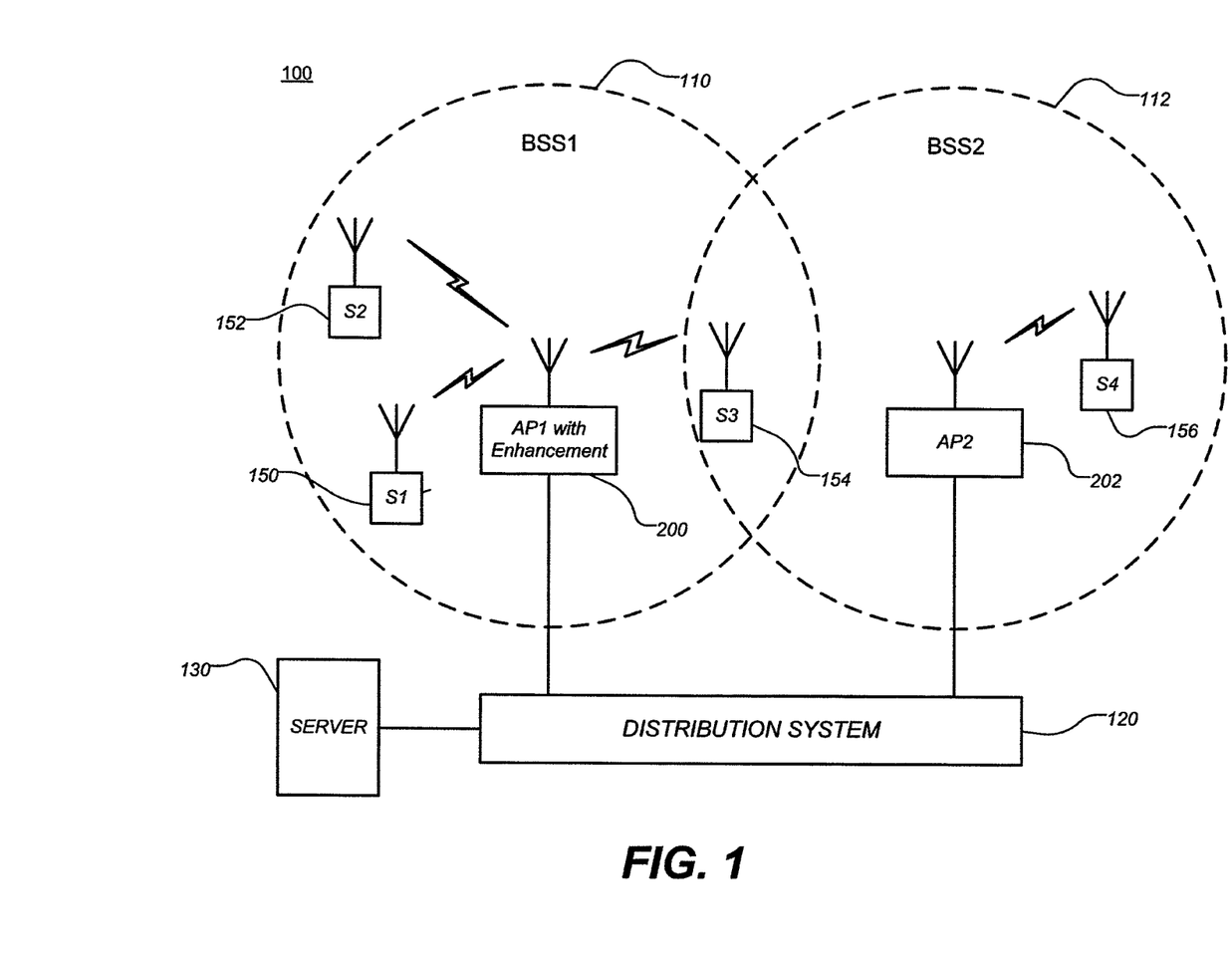
FIG. 1 shows a wireless local area network (WLAN) configuration employing an access point, constructed according to an embodiment of the disclosure.

FIG. 1 shows a configuration of a wireless local area network (WLAN) 100, constructed according to an embodiment of the disclosure. The WLAN 110 may include one or more basic service sets (BSS), such as, e.g., BSS 110 (BSS1), BSS 112 (BSS2) and/or the like. The BSS 110 may include an access point 200 (AP1), a plurality of stations associated to the access point 200, such as, e.g., station 150 (S1), station 152 (S2), station 154 (S3), and/or the like. The access point 200 may connect the associated stations 150, 152, 154 to a wireless network within the BSS 110. The BSS 112 may include an access point 202 (AP2), one or more stations (e.g., a station 156 (S4)) associated to the access point 202 and/or the like. The access point 202 may connect the associated station 156 to a wireless network within the BSS 112. Certain stations, such as, the station 154 may be located in an area where the BSS 110 and BSS 112 overlap. In this case, the station 154 may be associated with either of the access points 200, 202 although FIG. 1 shows the station 154 associated with the access point 200.

The access points 200, 202 may be connected to a distribution system 120, which may be a wired LAN or the like and configured to interconnect the access points, such as, e.g., the access points 200, 202, of the WLAN 100. The distribution system 120 may be connected to a server 130 or other networks, such as, e.g., the Internet (not shown), extranet (not shown) or the like. The distribution system 120 may allow any two or more stations, for example, the stations 150 and 156, connected to two different access points, for example, the access points 200, 202, to communicate with each other. Further, the distribution system 120 may allow any station (such as, e.g., stations 150, 152, 154, or 156) within the WLAN 100 to communicate with other entities, such as, e.g., stations associated to other WLAN, LAN or the like, that may be connected to the WLAN 100.

In the WLAN 100, one or more of the access points 200, 202 may be configured with enhanced features, such as, e.g., reduced power consumption, reduced memory requirement and/or the like. Although FIG. 1 shows only the access point 200 being configured with one or more enhanced features, any number of the access points in the WLAN 100 may be configured with the enhancements. The access point 200 may be a portable access point configured with an internal power source (such as, e.g., a rechargeable battery, a solar cell array, or the like). By reducing power consumption, any portable access point (such as, e.g., the access points 200, 202) may substantially extend its battery life. Even if the access point 200 is stationary and connected to a power source, the access point 200 may benefit from reduced power consumption due to the increasing environmental and economical constraints on energy consumption. The reduced memory requirement may also be advantageous because the access point 200 may be configured in a smaller housing or package, which may be particularly beneficial to portable access points. Furthermore, manufacturing costs may be reduced, since, e.g., less memory is needed.

Figure 2:
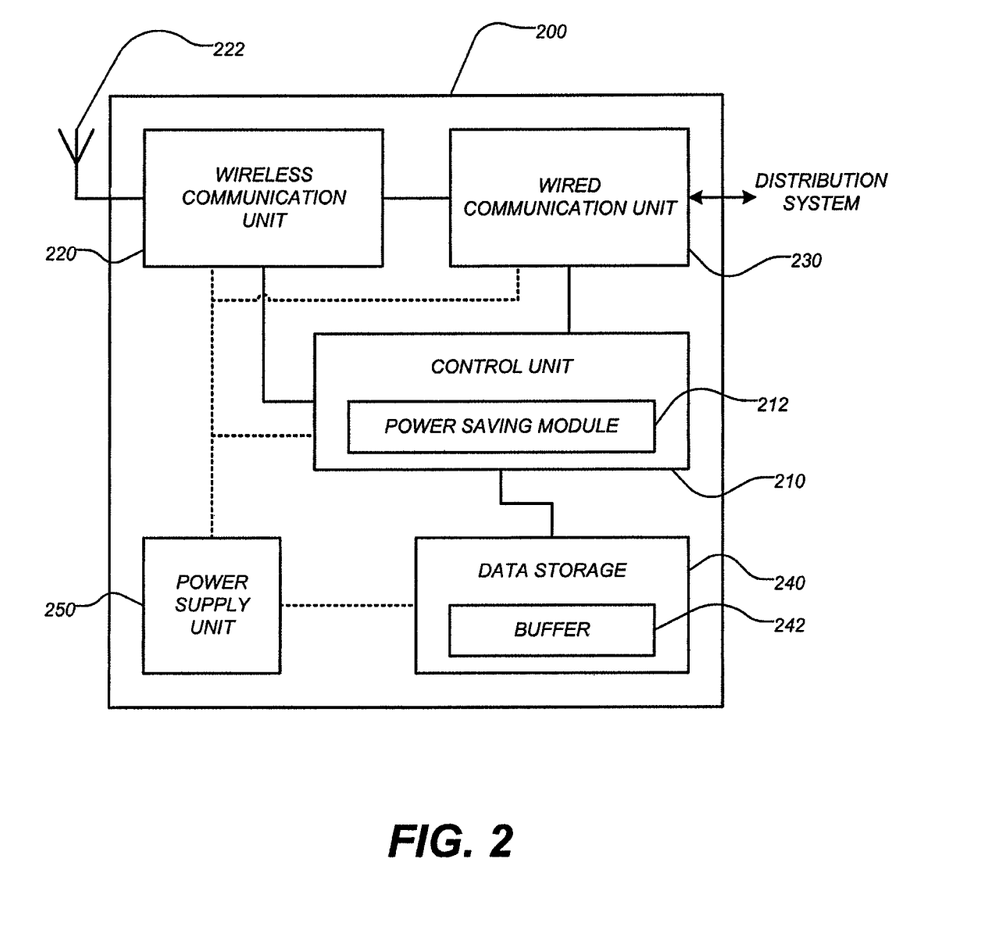
FIG. 2 shows an example of a configuration of the access point shown in FIG. 1, constructed according to an embodiment of the disclosure.

FIG. 2 shows a configuration of the access point 200 shown in FIG. 1, constructed according to an embodiment of the disclosure. The access point 200 may include a control unit 210, a wireless communication unit 220, a wired communication unit 230, a data storage unit 240, a power supply unit 250 and/or the like. The control unit 210 may be configured to control an overall operation of the access point 200, including operations related to reducing power consumption and/or operations requiring less memory. For example, the control unit 210 may include a power saving module 212 to operate the access point 200 with reduced power consumption. The control unit 210 may include a microprocessor, a microcontroller, or the like, which may be configured to execute instructions of a computer program stored in a machine readable storage medium. The instructions may include instructions for carrying out the power saving schemes. The control unit 210 may store the computer program embodying the instructions in its internal data storage (not shown), such as, e.g., an embedded read only memory (ROM), or the like, or, alternatively, in the data storage unit 240.

The wireless communication unit 220, which may include an antenna 222, may exchange data streams with the stations 150, 152, 154 (shown in FIG. 1) wirelessly via a specific radio frequency. The wired communication unit 230 may be connected to the distribution system 120 (shown in FIG. 1) and process data traffic between the access point 200 and the distribution system 120. The data storage unit 240 may temporarily store data that is sent to and from the associated stations 152, 154, 156. The data storage unit 240 may include a buffer 242 for buffering the data bound to the stations 152, 154, 156, as well as data bound to the access point 200 from the stations 152, 154, 156. The power supply unit 250 may be connected to the control unit 210, the wireless communication unit 220, the wired communication unit 230, the data storage unit 240 and/or the like, to supply power thereto. The power supply unit 250 may include a rechargeable battery, a non-rechargeable battery, an array of solar cells, a wired power supply configured to receive power from an external AC or DC power supply source, or the like.

The operations related to reducing power consumption may include scaling a clock frequency of the control unit 210, adjusting transmit power of the wireless communication unit 220, efficiently activating a sleep mode, and/or the like. Regarding the clock frequency scaling, active periods of the access point 200 are typically interleaved with relatively longer inactive periods. Thus, substantial reduction in power consumption may be achieved by a clock frequency of the control unit 210 when the access point 200 is not active. For example, the control unit 210 may operate at a lower clock frequency when no station is associated to the access point 200, none of the associated stations 150, 152, 154 is active, and/or the like. To achieve this, the access point 200 may be configured to adjust the clock frequency of the control unit 210 depending on a degree of the data traffic passing through the access point 200. The access point 200 may periodically determine an amount of data traffic flowing through the access point. Then, the access point 200 may lower the clock frequency of the control unit 210 when the amount of data traffic is reduced. In an embodiment, the control unit 210 may be configured to dynamically scale the clock frequency to the amount of the data traffic. Alternatively, the control unit 210 may be provided with one or more threshold data traffic amount values and/or ranges and compare the amount of data traffic to the threshold values and/or ranges to determine an appropriate clock frequency for the amount of the data traffic.

Figure 3:
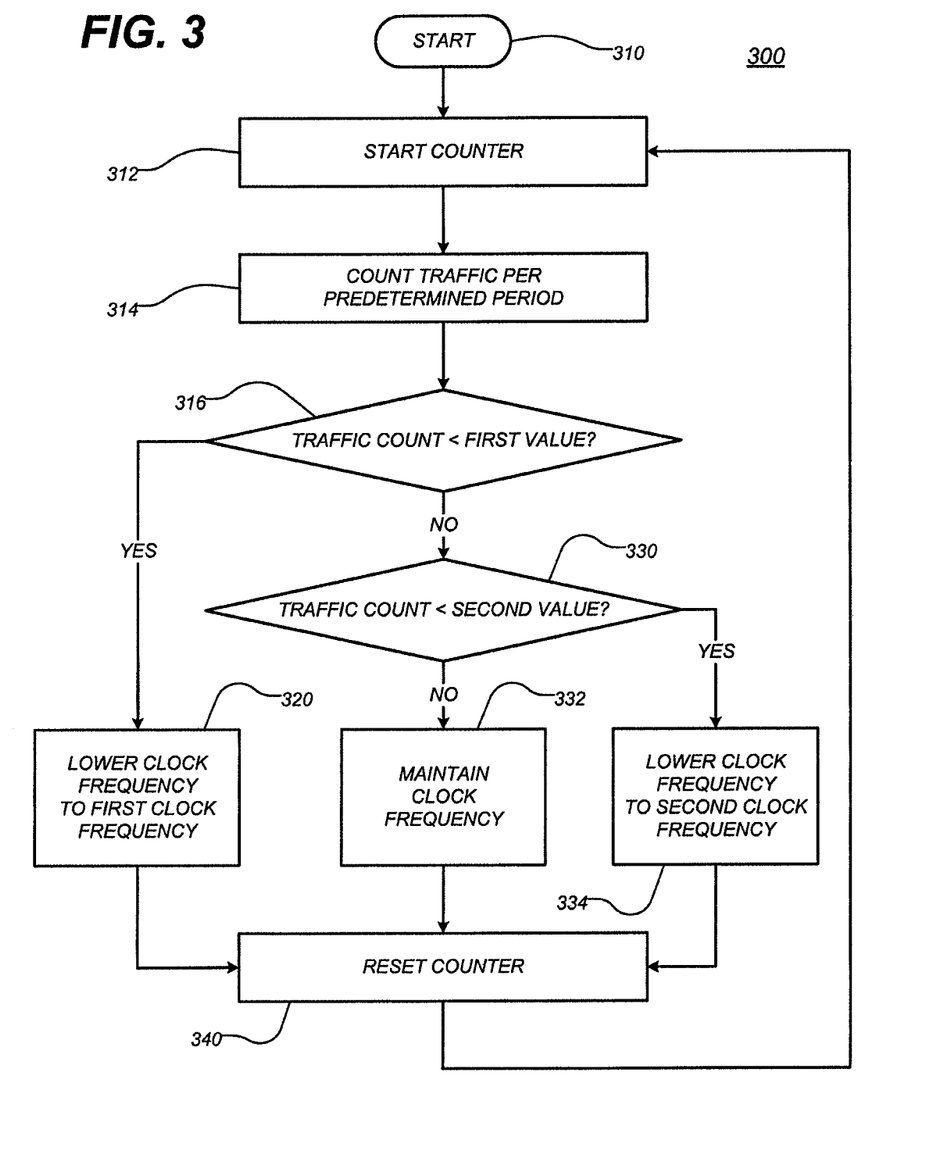
FIG. 3 shows a flow chart of a process for adjusting a clock frequency of a controller of an access point, according to an embodiment of the disclosure.

For example, FIG. 3 shows a flow chart of a process 300 for adjusting a clock frequency of a controller (such as, e.g., the control unit 210 shown in FIG. 2) of an access point, according to an embodiment of the disclosure. Upon starting the process at step 310, the access point may start or initialize a counter for a predetermined period of time (e.g., 1 second) at step 312. Then, the access point may determine an amount of data traffic passing through the access point during the predetermined period of time at step 314. The determined amount of data traffic may be then compared to a first predetermined threshold value (e.g., 1000 bytes or 1 packet per second) at step 316. The threshold value may be in terms of bytes, a number of packets and/or a combination of both bytes and a packet number. When the amount of data traffic during the predetermined period of time is smaller than the first predetermined threshold value at step 316, the clock frequency of the controller may be lowered to a first clock frequency (e.g., 5 MHz), which may substantially reduce power consumption by the controller.

For more precise scaling of the clock frequency, more than one predetermined threshold value may be used. For example, when the amount of data traffic during the predetermined period of time is greater than the first predetermined threshold value at step 316, the amount of data traffic may be compared to a second predetermined threshold value (e.g., 100 Kbytes or 100 packets per second), which may be higher than the first predetermined threshold value, at step 330. When the amount of data traffic is smaller than the second predetermined threshold value at step 330, the clock frequency of the controller may be lowered to a second clock frequency (e.g., 40 MHz) at step 334. The second clock frequency may be higher than the first clock frequency but lower than a normal clock frequency (e.g., 128 MHz) of the controller. When the amount of data traffic is greater than the second predetermined threshold value, the controller may maintain the normal clock frequency at step 332. Once the clock frequency of the controller is adjusted or maintained at steps 320, 332, 334, the access point may reset the counter at step 340, and the process may loop back to starting the counter at step 312. Alternatively, the process 300 may end.

Although FIG. 3 shows only two predetermined threshold values for comparison with the amount of the data traffic passing through the access point, the number of threshold values might not be limited thereto and more than two threshold values may be used. Alternatively, the clock frequency of the controller may be adjusted proportionally to the amount of the data traffic passing through the access point.

Additionally or alternatively, an access point may be configured to reduce the power consumption by adjusting transmit power. More specifically, the access point may adjust the transmit power depending on proximity (or distance) of stations associated thereto. For example, in FIG. 1, when all the associated stations 150, 152, 154 are located close to the access point 200, the access point 200 may reduce the transmit power, which may reduce power consumption.

Figure 4:
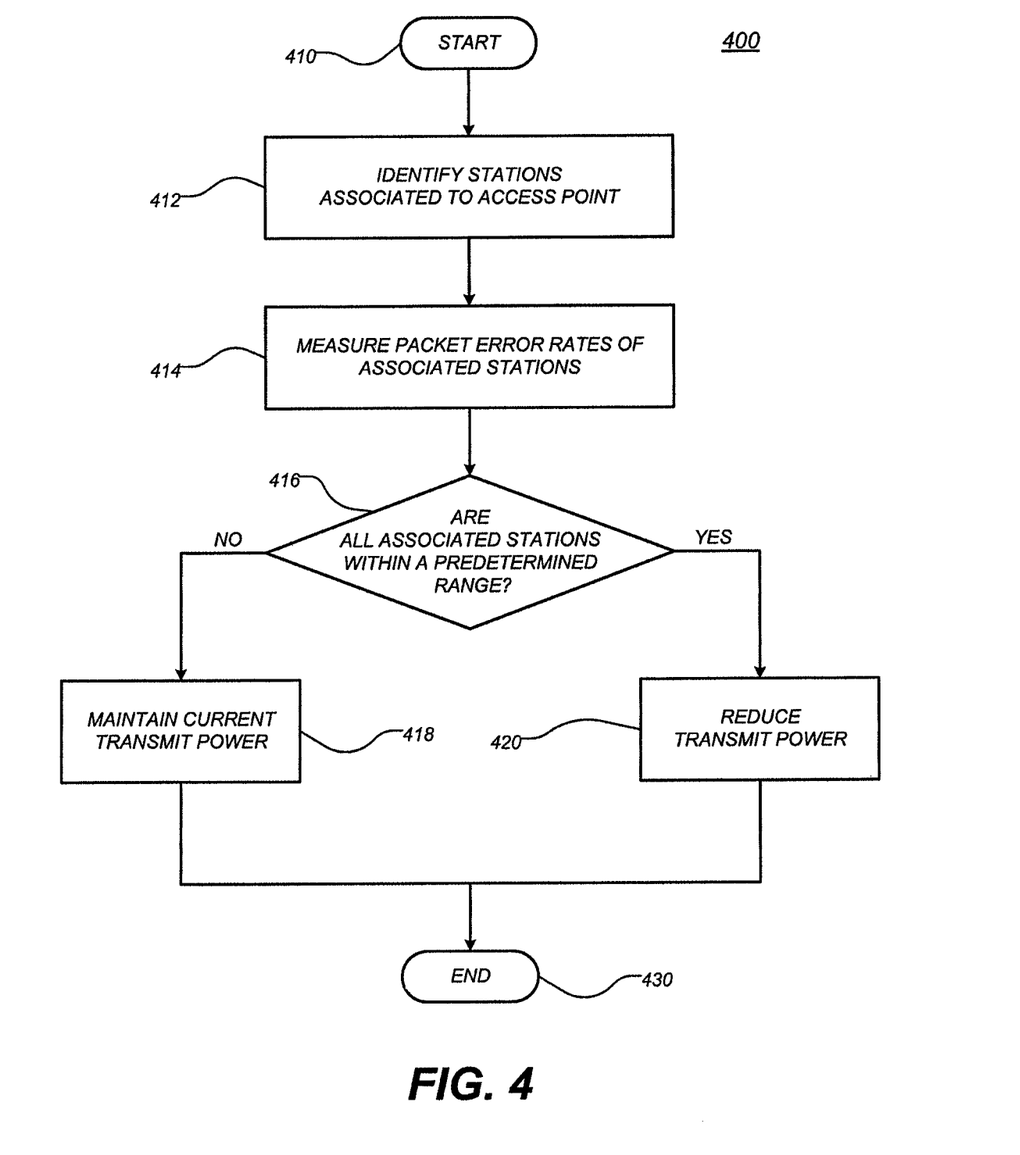
FIG. 4 shows a flow chart of a process for adjusting a transmit power of an access point, according to an embodiment of the disclosure.

FIG. 4 shows a flow chart of a process 400 for adjusting a transmit power of an access point, according to an embodiment of the disclosure. Upon starting the process at step 410, an access point may identify stations that are associated thereto at step 412. Then, the access point may determine proximity of the associated stations. For example, the access point may use transmit power control (TPC) algorithm, which is typically used to prevent undesirable interferences between two or more neighboring BSS's. The access point may measure a packet error rate (PER) of each associated station, as known in the art, at step 414. Based on the PER of each station, the access point may determine whether each station is within a predetermined range from the access point. For example, when the PER of each associated station is lower than a predetermined threshold value (e.g., about 10%), the access point may determine that all the associated stations are within a predetermined range and reduce the transmit power at step 420. Other methods may be used to determine whether the associated stations are within a predetermined range. When one or more associated stations are located outside the predetermined range at step 416, the access point may maintain the normal transmit power at step 418. Upon completing step 418 or step 420, the process 400 may terminate at step 430.

The process 400 may be repeated periodically to more aggressively attempt to reduce power consumption. Furthermore, more than one predetermined range may be used to more precisely scale the transmit power depending on proximity of the associated stations. Additionally, an inverse operation may be performed at steps 416 and 420. That is, if it is determined that all of the associated stations have moved away from the access point (step 416), beyond a predetermined range, then the transmit power may be increased by a predetermined value (step 420).

Another effective way to reduce power consumption may be to effectively activate a sleep mode in an access point since an access point typically consumes a minimum amount of power during the sleep mode. However, it may be necessary to ensure that there is no active traffic in a BSS to which the access point belongs. This may be achieved in several different ways, including, for example, a clear-to-send (CTS) based sleep mode, a contention free period based sleep mode, a quiet period based sleep mode and/or the like.

In the CTS based sleep mode, an access point (such as, e.g., the access point 200 in FIG. 1) may send a CTS-to-self frame to prevent stations (such as, e.g., the stations 150, 152, 154 in FIG. 1) associated thereto from sending any data to the access point. Then the access point may enter a sleep mode for a predetermined duration (i.e., sleep duration) specified in the CTS-to-self frame. The maximum sleep duration may be equal to a maximum duration that may be designated in the CTS-to-self frame, which may be, for example, about 32 ms. However, the access point may determine the actual sleep duration based on a level of activity in the BSS. More specifically, the access point may keep track of a percentage of time that the access point is transmitting over the BSS, which is commonly referred to as medium occupancy, and may enter the sleep mode only for an amount of time when the BSS is expected to remain idle. This may be continuously adapted by tracking medium occupancy in the BSS periodically.

Figure 5:
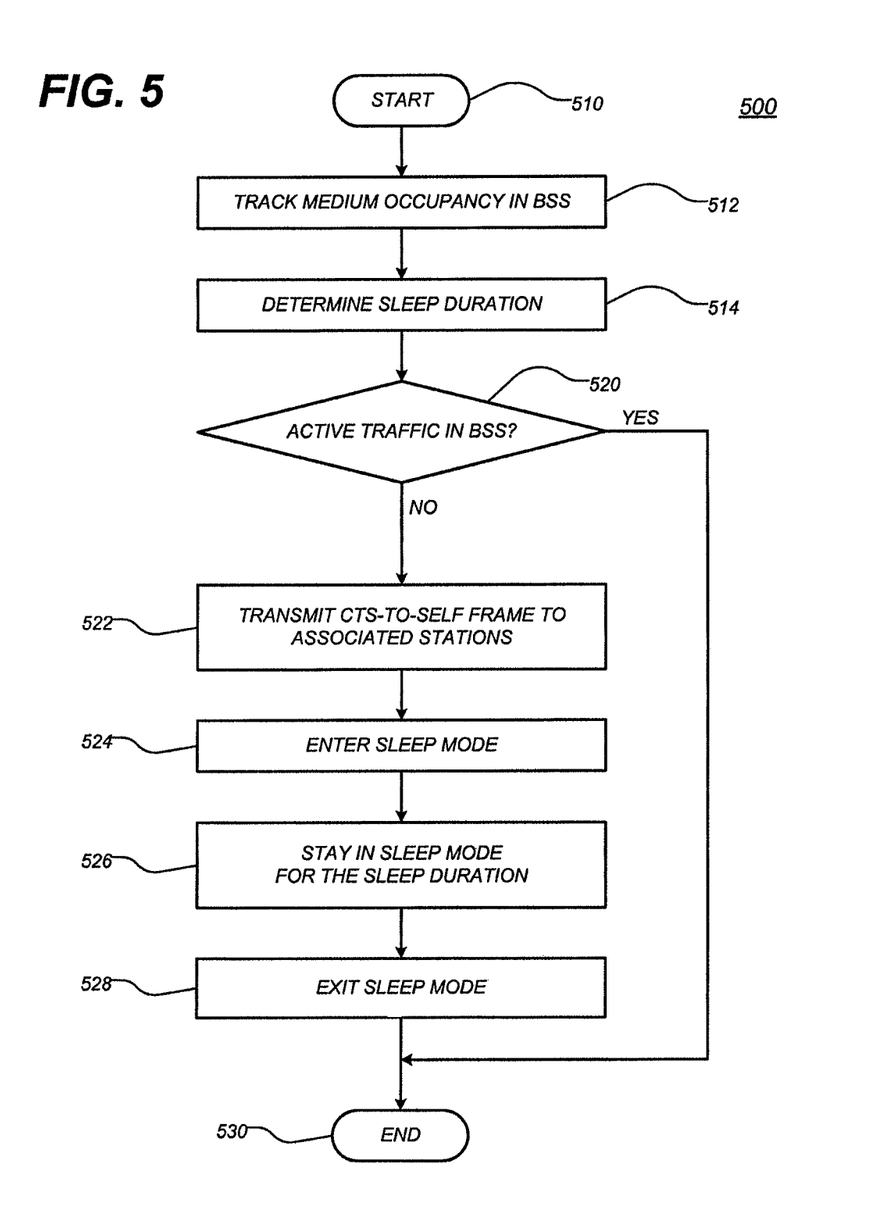
FIG. 5 shows a flow chart of a process for activating a sleep mode in an access point, according to an embodiment of the disclosure.

FIG. 5 shows a flow chart of a process 500 for operating the CTS-based sleep mode in an access point, according to an embodiment of the disclosure. Upon starting the process 500 at step 510, the access point may track medium occupancy of its BSS at step 512. Then, the access point may determine a sleep duration at step 514 based on the medium occupancy of the BSS obtained at step 512. When it is determined that there is active data traffic in the BSS at step 520, the access point may take no action to enter the sleep mode and the process 500 may terminate at step 530. However, when it is determined that there is no active data traffic in the BSS at step 520, the access point may transmit a CTS-to-self frame to each of the associated stations at step 522. The CTS-to-self frame may include the sleep duration determined at step 514. Upon receiving the CTS-to-self frame, the associated stations might not send data to the access point during the sleep duration specified in the CTS-to-self frame. Then, the access point may enter the sleep mode at step 524, and may stay in the sleep mode for the sleep duration at step 526. The access point may wake up when the sleep duration lapses at step 528, and the process 500 may terminate at step 530.

As an alternative to the (CTS) based sleep mode operation, a contention free period (CFP) based sleep mode operation, a quiet period based sleep mode operation and/or the like may be used to operate the access point with reduced power consumption. In the CFP based sleep mode operation, the access point may advertise a contention free period in its beacons, which may prevent the associated stations from sending data traffic during the contention free period. Thus, the access point may safely enter and stay in the sleep mode during the contention free period. More specifically, an exact duration of the contention free period may be advertised in a MaxCFP-Duration field in the beacon. The CFP based sleep mode operation may be executed based on the activities in the BSS, which may be similar to the CTS based sleep mode operation shown in FIG. 5. Similarly, in the quiet period based sleep mode operation, the access point may also send quiet information element (IE) as part of a beacon to the associated stations in order to periodically silence the associated stations for a predetermined period of time before entering and staying in a sleep mode for a predetermined period of time.

To operate the CTS based sleep mode successfully, it may be necessary to ensure that all of the associated stations are not in a sleep mode when the access point transmits the CTS-to-self frame. Otherwise, one or more of the associated stations may be in a sleep mode when the access point transmits the CTS-to-self frame and, thus, fail to receive the CTS-to-self frame. Then, the one or more associated stations in the sleep mode may wake up while the access point is in the sleep mode and try to send data to the access point. To avoid this situation, the access point may send the CTS-to-self frame immediately after sending a delivery traffic indication message (DTIM) to ensure that the associated stations are not in the sleep mode and, hence, will receive the CTS-to-self frame.

Figure 6:
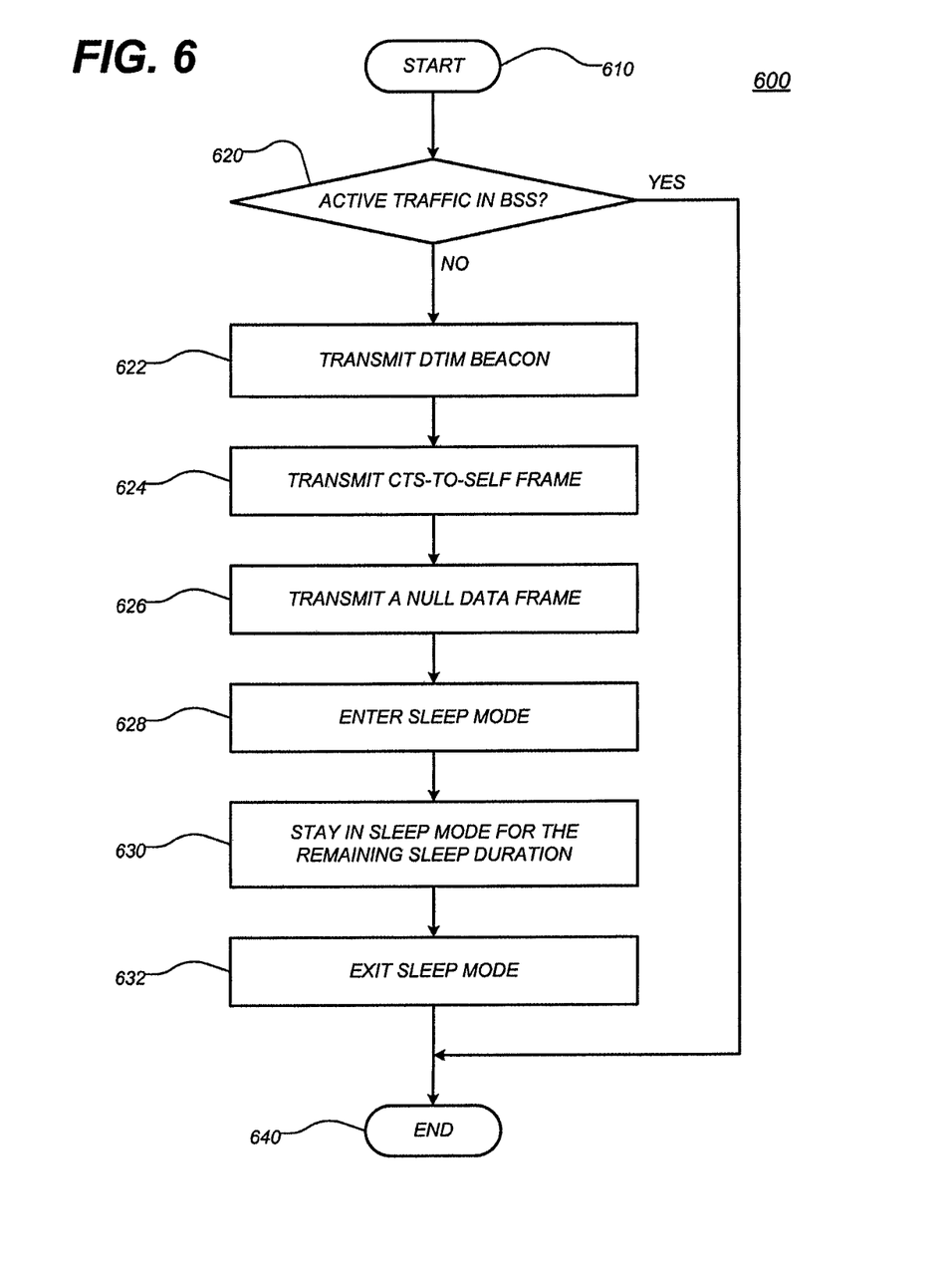
FIG. 6 shows a flow chart of a process for suspending an associated station from sending data traffic to an access point in a sleep mode, according to an embodiment of the disclosure.

FIG. 6 shows a flow chart of a process 600 for suspending the associated stations from sending data to an access point, according to an embodiment of the disclosure. The process 600 may be performed in connection with the process 500 shown in FIG. 5. Upon starting the process 600 at step 610, the access point may monitor activities in the BSS at step 620. If it is determined that there is active data traffic in the BSS at step 620, the process 600 may terminate at step 640. When it is determined that there is no active data traffic in the BSS at step 620, the access point may transit a DTIM beacon to the associated stations. More specifically, the access point may, e.g., set a broadcast DTIM flag to 1 in the DTIM beacon to ensure that any associated stations in the sleep mode may stay awake to receive data that may be subsequently transmitted from the access point. After transmitting the DTIM beacon at step 622, the access point may transmit the CTS-to-self frame to the associated stations to ensure that the associated stations do not send any data to the access point during the sleep duration specified in the CTS-to-self frame. Optionally, the access point may transmit a broadcast null data frame to the associated stations at step 626, in order to allow the associated stations to enter the sleep mode. To achieve this, the broadcast null data frame may be transmitted with the "more" data bit cleared.

Once the CTS-to-self frame is transmitted at step 624, the access point may enter a sleep mode at step 628 and stay in the sleep mode for the remaining portion of the sleep duration specified in the CTS-to-self frame at step 630. The access point may wake up when the sleep duration has lapsed at step 632 and the process 600 may terminate at step 640.

When one or more of the associated stations are in the sleep mode, the access point may enter the sleep mode at most once per DTIM interval. Thus, the process 600 may be particularly useful when the DTIM period is relatively low, for example, when a DTIM interval is around 35 ms (e.g., beacon interval=35 ms, DTIM period=1). In this case, the access point may take advantage of the process 600 to stay powered down for a maximum 90% of the total DTIM period, unless it is determined that there is active traffic in the BSS at step 620. Even with a commonly used beacon interval of 100 ms, the process 600 may achieve, e.g., about 30% power savings.

The CTS-based sleep mode operation shown in FIG. 5 may cause undesirable interference on an overlapping or neighboring BSS. For example, in FIG. 1, the CTS-based sleep mode operation performed in the BSS 110 may interfere with operations of the BSS 112. More specifically, upon receiving the CTS-to-self frame from the access point 200 of the BSS 110, the access point 202 and/or the station 156 in the BSS 112 may also stop sending data during the sleep duration in the CTS-to-self frame. Thus, when performing the CTS-based sleep mode operation, it may be necessary to reduce or minimize the interference on an overlapping or neighboring BSS. This may be achieved by transmitting the CTS-to-self frame at an optimal transmit power, which may be strong enough to reach all the associated stations but not strong enough to reach an access point and/or stations in an overlapping or neighboring BSS.

In an embodiment, an access point may sequentially transmit request-to-send (RTS) frames at gradually increased transmit power levels, preferably starting from a lowest transmit power level, until the access point successfully receives responses from all the stations associated thereto. The RTS frame indicates that the access point is ready to send data. Thus, even if it reaches an overlapping or neighboring BSS, the impact on the overlapping or neighboring BSS may be relatively smaller compared to the impact a CTS-to-self frame may have on the BSS. Once the successful responses are received from all the associated stations, the access point may transmit a CTS-to-self frame at the power level the RTS frames were transmitted when all the associated stations have responded.

Figure 7:
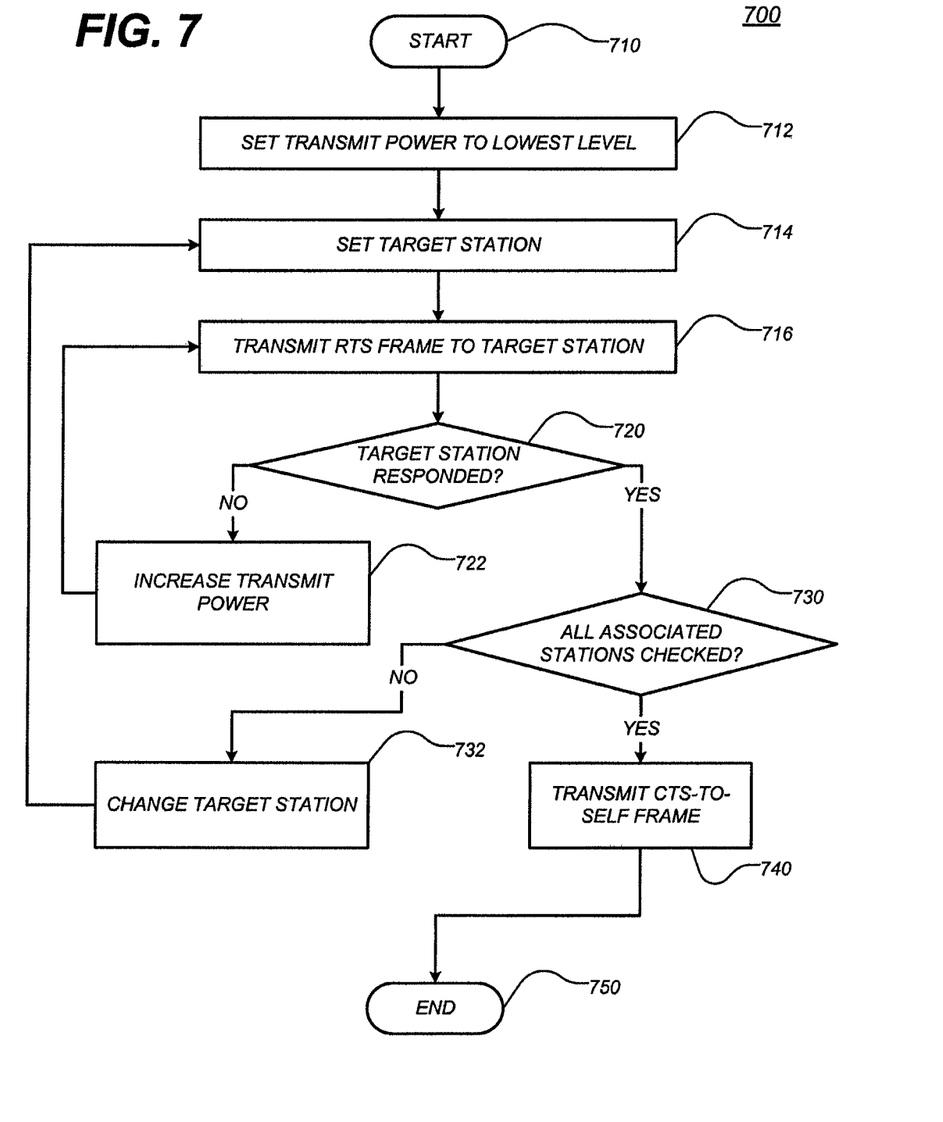
FIG. 7 shows a flow chart of a process for reducing an impact on another basic service set (BSS) when an access point suspends an associated station from sending data traffic, according to an embodiment of the disclosure.

FIG. 7 shows a flow chart of a process 700 for reducing an impact on another basic service set (BSS) when an access point operates the CTS-based sleep mode, according to an embodiment of the disclosure. Upon starting the process 700 at step 710, the access point may set its transmit power to the lowest level (e.g., 5 dBm) at step 712. Then, the access point may set one of stations associated thereto as a target station, and transmit an RTS frame to the target station at the lowest power level at step 716. When the target station does not respond to the RTS frame at step 720, the access point may slightly increase the transmit power level at step 722 and the process 700 may loop back to transmitting the RTS frame to the target station at the increased transmit power at step 716.

When it is determined that the target station responses to the RTS frame at 720, the access point may determine whether all of the associated stations have been checked as the target station at step 730. When it is determined that one or more associated stations have not been checked at step 730, the access point may change the target station to one of the stations that have not been checked at step 732, and the process 700 may move to set another station as the new target station 714. These steps (e.g., steps 714, 716, 720, 722, 730, 732) may be repeated until the access point receives responses to the RTS frame from all the associated stations. As a result, the transmit power may be increased to an optimum power level at which the RTS frame has been transmitted when all the associated stations have responded thereto.

Once all of the associated stations have been checked as the target station at step 730, the access point may transmit a CTS-to-self frame at the optimum power level at step 740. This may ensure that the CTS-to-self frame may reach all of the associated stations while preventing the CTS-to-self frame from reaching further than the most distant associated station. For example, in FIG. 1, the access point 200 may transmit the CTS-to-self frame at a sufficient power level to reach all of the associated stations 150, 152, 154, but not sufficient to reach the access point 202 or the station 156 in the BSS 112. Upon transmitting the CTS-to-self frame at the optimized power level at step 740, the process may terminate at step 750.

In addition to optimizing the transmit power level to minimize the impact on overlapping or neighboring BSSs, an access point may need to leave sufficient available medium time for other devices (such as, e.g., an access point, a station and/or the like) in an overlapping BSS when the devices are within a communication range from the access point. To achieve this, the access point may determine the medium occupancies of the BSSs as respective percentages of the total available medium time. Then, the access point may not stay in a sleep mode longer than the idle time available on the radio frequency channel. For example, when the current medium occupancy of the BSS is 75%, the access point of the BSS may not stay in the sleep mode longer than 25% of the beacon interval.

As mentioned above, another enhancement that may be implemented in an access point is to reduce a memory requirement. For example, an access point may include a smaller memory in order to reduce a physical size and manufacturing costs thereof, which may be particularly advantageous for a portable access point. Typically, an access point rarely sends data to an associated station in a sleep mode because, if there is incoming data traffic, the station may stay awake until processing of the incoming data traffic is completed. If the station stays in a sleep mode and does not process the incoming data traffic, it may mean that the incoming data traffic may not be important to the station and may no longer need to be buffered. Thus, the access point may reserve a smaller buffer (for example, 2 Kbytes) for each associated station in the sleep mode and may drop excess data traffic when the buffer overflows.

Figure 8:
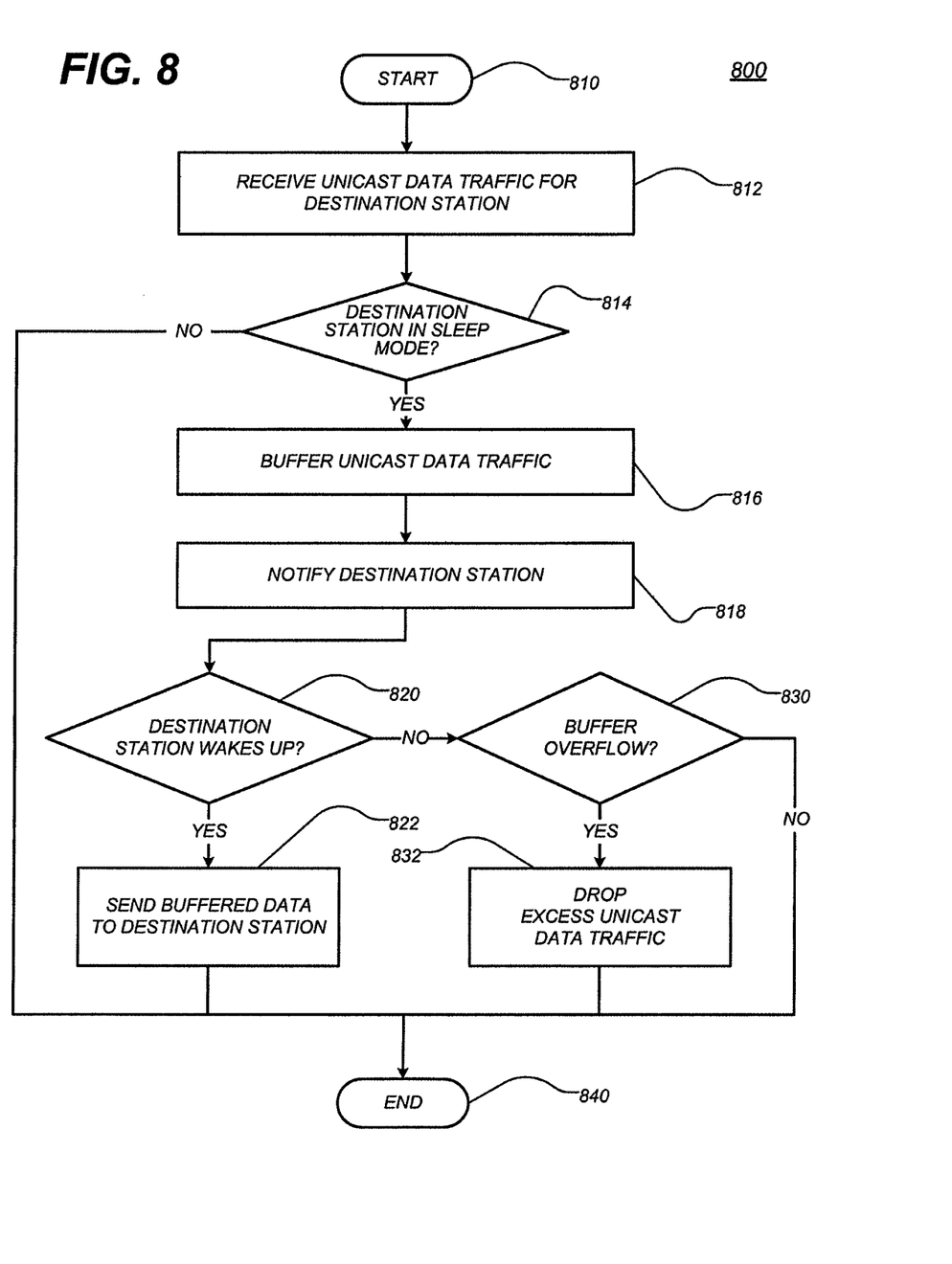
FIG. 8 shows a flow chart of a process for operating an access point to handle unicast data traffic, according to an embodiment of the disclosure.

FIG. 8 shows a flow chart of a process 800 for operating an access point to process unicast data traffic for a destination station associated thereto, according to an embodiment of the disclosure. After starting the process 800 at step 810, the access point may receive unicast data traffic destined for the destination station at step 812. If the destination station is not in a sleep mode at step 814, the process 800 may terminate at step 840. If the destination station is in: a sleep mode at step 814, the access point may buffer the unicast data at step 816 and notify the destination station of the incoming data therefor at step 818. For example, the access point may transmit a DTIM beacon to the destination station to notify the station of the incoming data traffic. If the destination station reacts positively to the notification at step 820 (e.g., waking up from the sleep mode), the buffered data may be sent to the destination station at step 822 and the process 800 may terminate at step 840. However, if the destination station reacts negatively (e.g., responding with an instruction not to send the buffered data) or the destination station does not respond (react) to the notification at step 820 (e.g., staying in the sleep mode) and the buffer overflows with the unicast data at step 830, the access point may drop the excess unicast data at step 832. The station may react negatively or not respond to the notification at step 820 where, for example, the unicast data may not be important to the destination station. When the buffer does not overflow at step 830, the access point may keep buffering the unicast data and the process 800 may terminate at step 840. Accordingly, by configuring the access point to drop the excess unicast data in the destination buffer when the buffer overflows, the access point may operate normally with a smaller buffer with reduced storage capacity.

With respect to multicast data traffic buffering, an access point may buffer all multicast data traffic if any of the destination stations associated thereto is in a sleep mode. The multicast data may be delivered to the destination stations after the access point transmits a DTIM beacon. Except for occasional active situations (such as, e.g., multicasting streaming), the multicast data may be typically used for non-active situations (e.g., service advertisement, discovery and/or the like). In the non-active situations, an active service or agent may generate multicast frames less frequently than once every few seconds. Thus, the access point may be configured to adjust a number of buffers reserved for each destination station depending on a situation, such as, e.g., the active situations, the non-active situation and the like. Particularly, the access point may reserve a smaller number of buffers (e.g., five to ten buffers) for buffering the multicast data for the non-active situations.

The multicast data frames for the non-active situations may be typically much shorter than the maximum frame length. Thus, the access point may be configured to adjust the buffer size in order to reduce the overall memory requirement. For example, the access point may store the non-active multicast data frames in, e.g., without limitation, a contiguous FIFO or the like.

The access point may be further configured to buffer overflow multicast data traffic in host memory when all the reserved buffers in device memory become entirely occupied before the DTIM beacon arrives. This may be achieved by, for example, a token passing mechanism between the host and the device. The device may send tokens to the host when the buffers reserved for multicast data traffic during the sleep mode become free. The host may deduct tokens when it sends multicast data frames to the device. The host may limit the multicast data traffic sent to the associated station based upon the number of tokens it currently possesses.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. An access point configured to connect a station to a wireless network, the access point comprising:
   a wireless communication unit configured to send data to the station; and
   a control unit configured to:
      determine if the access point should enter a low power mode based on indicative parameters of a basic service set (BSS),
      determine a sleep duration for when the access point enters the low power mode based on a percentage of time that the access point is transmitting over the BSS,
      send, to the station via the wireless communication unit, a first notification that includes a clear to send to self (CTS-to-self) frame to cause the station to temporarily suspend sending data to the access point during the sleep duration, and
      cause the access point to enter the low power mode for the sleep duration.

2. The access point of claim 1, further comprising a data storage configured to buffer the data destined to the station.

3. The access point of claim 2, wherein the one or more indicative parameters of the BSS comprise at least one of:
   an amount of data traffic flowing through the access point;
   proximity of the station to the access point;
   an activity level in the BSS; and
   a reaction of the station in response to a second notification regarding the data buffered at the data storage.

4. The access point of claim 3, wherein the control unit is further configured to:
   adjust a clock frequency of the control unit based on the amount of data traffic flowing through the access point;
   adjust a transmit power of the wireless communication unit based on the proximity of the station to the access point; and
   adjust an occupancy of the data storage based on the reaction of the station to the second notification regarding the data buffered at the data storage.

5. The access point of claim 4, wherein the control unit is configured to lower the clock frequency of the control unit when the amount of data traffic flowing through the access point is reduced.

6. The access point of claim 4, wherein the control unit is configured to determine the proximity of the station to the access point based on a packet error rate (PER) of the station.

7. The access point of claim 2, wherein the control unit is further configured to adjust an amount of memory in the data storage dedicated to buffering multicast data for the station based on a type of multicast data to be buffered.

8. The access point of claim 1, wherein the wireless communication unit is configured to, prior to transmitting the first notification, transmit a delivery traffic indication message (DTIM) to the station.

9. The access point of claim 1, further comprising a data storage;
   wherein the control unit is further configured to:
      buffer the data destined to the station in a buffer in the data storage,
      determine whether the station is in the low power mode,
      when it is determined that the station is in the low power mode, send a second notification to the station regarding the data buffered in the buffer,
      when it is determined that the station is in the low power mode, transmit data in the buffer to the station when the station exits the low power mode in response to the second notification, and
      when it is determined that the station is in the low power mode, discard excess data that overflows the buffer when at least one of i) the station does not respond to the second notification, or ii) the station responds by instructing the access point not to send the data.

10. A method of operating an access point configured to connect a station to a wireless network, the method comprising:
    monitoring one or more indicative parameters of a basic service set (BSS), the BSS comprising the access point and the station;
    determining if the access point should enter a low power mode based on the indicative parameters;
    determining a sleep duration for when the access point enters the low power mode based on a percentage of time that the access point is transmitting over the BSS;
    sending, to the station via the wireless communication unit, a first notification that includes a clear to send to self (CTS-to-self) frame to cause the station to temporarily suspend sending data to the access point during the sleep duration; and
    causing the access point to enter the low power mode for the sleep duration.

11. The method of claim 10, wherein the monitoring one or more indicative parameters of the BSS comprises at least one of:
    monitoring an amount of data traffic flowing through the access point;
    monitoring proximity of the station to the access point;
    monitoring an activity level in the BSS; and
    monitoring a reaction of the station to a second notification regarding data destined to the station and buffered at the access point.

12. The method of claim 11, wherein the method further comprises at least one of:
    adjusting a clock frequency of the access point, wherein the clock frequency of the access point is adjustable based on the amount of data traffic flowing through the access point;
    adjusting a transmit power of the access point, wherein the transmit power of the access point is adjustable based on the proximity of the station to the access point; and
    adjusting an occupancy of a buffer of the access point, wherein the occupancy of the buffer is adjustable based on the reaction of the station to the second notification regarding the data destined to the station and buffered at the buffer.

13. The method of claim 12, wherein the adjusting the clock frequency of the access point comprises lowering the clock frequency when the amount of data traffic flowing through the access point is reduced.

14. The method of claim 12, wherein the monitoring the proximity of the station to the access point comprises:
    identifying the station;
    obtaining a packet error rate (PER) of the station; and
    determining the proximity of the station based on the PER.

15. The method of claim 12, wherein the monitoring the reaction of the station to the second notification comprises:
    receiving the data destined to the station;
    determining whether station is in a low power mode;
    buffering the data in the buffer reserved for the station when the station is in the low power mode;
    notifying the station of the data destined to the station;

determining whether the station wakes, up to receive the data; and determining whether the buffer overflows with the data, wherein the access point discards the data buffered in the buffer when the station does not wake up and the buffer overflows.

16. The method of claim 10, wherein determining the sleep duration is based on determining when there is no activity in the BSS.

17. The method of claim 10, wherein the method further comprises, prior to transmitting the first notification, transmitting a delivery traffic indication message (DTIM) to the station.

18. The method of claim 10, wherein the method further comprises:

buffering the data destined to the station in a buffer in a data storage, determining whether the station is in the low power mode, when it is determined that the station is in the low power mode, sending a second notification to the station regarding the data buffered in the buffer, when it is determined that the station is in the low power mode, transmitting data in the buffer to the station when the station exits the low power mode in response to the second notification, and when it is determined that the station is in the low power mode, discarding excess data that overflows the buffer when at least one of i) the station does not respond to the second notification, or ii) the station responds by instructing the access point not to send the data.

19. The method of claim 10, wherein the method further compromises:

adjusting an amount of memory in a data storage dedicated to buffering multicast data for the station based on a type of multicast data to be buffered.

20. A wireless network including one or more basic service sets (BSS) connected to a distribution system, each BSS comprising:

one or more stations; and an access point configured to connect the one or more stations to the wireless network, the access point comprising:

a wired communication unit connected to the distribution system to receive data destined to the one or more stations;

a wireless communication unit configured to send the data to the one or more stations; and a control unit configured to:

monitor one or more indicative parameters of the BSS, determine if the access point should enter a low power mode based on the indicative parameters, determine a sleep duration for when the access point enters the low power mode based on a percentage of time that the access point is transmitting over the BSS, send, to the one or more stations via the wireless communication unit, a first notification that includes a clear to send to self (CTS-to-self) frame to cause the one or more stations to temporarily suspend sending data to the access point during the sleep duration, and cause the access point to enter the low power mode for the sleep duration.

* * * * *